United States Patent
Jeon et al.

(10) Patent No.: US 10,507,818 B2
(45) Date of Patent: Dec. 17, 2019

(54) SHIFT CONTROL APPARATUS AND METHOD FOR VEHICLE

(71) Applicants: HYUNDAI MOTOR COMPANY, Seoul (KR); KIA MOTORS CORPORATION, Seoul (KR)

(72) Inventors: Byeong Wook Jeon, Seoul (KR); Sangjun Park, Seoul (KR); Kwang Hee Park, Suwon-si (KR)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 128 days.

(21) Appl. No.: 15/832,139

(22) Filed: Dec. 5, 2017

(65) Prior Publication Data

US 2018/0290643 A1 Oct. 11, 2018

(30) Foreign Application Priority Data

Apr. 7, 2017 (KR) .................. 10-2017-0045217

(51) Int. Cl.
- *B60W 10/11* (2012.01)
- *B60W 30/19* (2012.01)
- *B60W 40/076* (2012.01)

(52) U.S. Cl.
CPC .......... *B60W 10/11* (2013.01); *B60W 30/19* (2013.01); *B60W 40/076* (2013.01); *B60W 2510/0657* (2013.01); *B60W 2510/1005* (2013.01)

(58) Field of Classification Search
CPC .......... F16H 59/14; F16H 59/66; F16H 59/68; F16H 2059/147; F16H 2059/663; F16H 2059/666; F16H 2059/6815
See application file for complete search history.

(56) References Cited

U.S. PATENT DOCUMENTS

| | | | |
|---|---|---|---|
| 9,714,704 B2* | 7/2017 | Johansson | B60W 30/18072 |
| 10,253,871 B2* | 4/2019 | Hose | B60W 10/11 |
| 2015/0362065 A1* | 12/2015 | Johansson | B60W 30/18072 |
| | | | 701/65 |
| 2018/0058574 A1* | 3/2018 | Ishiguro | F16H 59/18 |
| 2018/0156329 A1* | 6/2018 | Hose | B60W 10/11 |

FOREIGN PATENT DOCUMENTS

| | | |
|---|---|---|
| JP | 09-229173 A | 9/1997 |
| JP | 5477928 B2 | 4/2014 |
| KR | 10-2010-0058135 A | 6/2010 |
| WO | WO-2016152749 A1 * | 9/2016 ............. F16H 59/18 |

* cited by examiner

*Primary Examiner* — David R Morris
(74) *Attorney, Agent, or Firm* — Brinks Gilson & Lione

(57) ABSTRACT

A shift control apparatus and a method for a vehicle are provided. The shift control apparatus and the method for a vehicle that can control gear shifts by detecting a slope ahead based on road information are provided. The shift control apparatus for a vehicle may include: an engine; a transmission configured to receive power from the engine; and a controller configured to check an effective sloping point based on road information, to calculate a target gear ratio based on a first engine torque at a location of the vehicle and a gear ratio of the transmission when the effective sloping point is reached within a predetermined amount of time, to set a target gear position based on the target gear ratio, and to control the transmission based on the target gear position.

14 Claims, 7 Drawing Sheets

SHIFT CONTROL APPARATUS AND METHOD FOR VEHICLE

CROSS-REFERENCE TO RELATED APPLICATION

The present application claims priority to and the benefit of Korean Patent Application No. 10-2017-0045217, filed on Apr. 7, 2017, which is incorporated herein by reference in its entirety.

FIELD

The present disclosure relates to a shift control apparatus for a vehicle, and more particularly, to a shift control apparatus and method for a vehicle that can control gear shifts by detecting a slope ahead based on road information.

BACKGROUND

The statements in this section merely provide background information related to the present disclosure and may not constitute prior art.

In general, a vehicle is equipped with a transmission that adjusts the vehicle's traveling speed by receiving power from the engine. Transmissions may be divided into two types: manual transmissions that allow the driver to take control and automatic transmissions that are automatically controlled depending on the vehicle's traveling speed.

A vehicle fitted with a typical automatic transmission shifts gears in a uniform way according to how "shift patterns" are set using the vehicle's speed and the positional value of the accelerator pedal.

That is, the vehicle shifts gears by the shift patterns if a certain vehicle speed is reached by the driver's manipulation of the accelerator pedal. Gears are selected based on the relationship between the current vehicle speed and the accelerator pedal.

Thus, when there is an abrupt change in driving load on a road, gear shifting may not be properly done until the speed is slowed down or the driver manipulates the accelerator pedal upon detecting this change. This will cause the driver to experience a delay in acceleration due to a lack of the vehicle's driving torque or an excessive acceleration due to a surplus of driving torque.

Even if the driver accelerates, by the time they perceive a lack of driving torque, they might feel discontented with the delay in acceleration. Accordingly, it may be desirable to make a proper gear change before the driver perceives a lack of driving torque.

The above information disclosed in this section is only for enhancement of understanding of the background of the disclosure and therefore it may contain information that does not form the prior art that is already known in this country to a person of ordinary skill in the art.

SUMMARY

The present disclosure provides a shift control apparatus and method for a vehicle that can control gear shifts by detecting a slope ahead based on road information.

In another aspect, an exemplary form of the present disclosure provides a shift control apparatus and method for a vehicle that can make a gear shift by selecting the best gear for a predicted change in driving load ahead.

One form of the present disclosure provides a shift control apparatus for a vehicle, including: an engine; a transmission configured to receive power from the engine; and a controller configured to check an effective sloping point based on road information, when the effective sloping point is reached within a predetermined amount of time, to calculate a target gear ratio based on a first engine torque at a location of vehicle and a gear ratio of the transmission, to set a target gear position based on the target gear ratio, and to control the transmission based on the target gear position.

The controller may be configured to calculate the target gear ratio such that a first residual driving torque at the vehicle's location and a second residual driving torque at the effective sloping point are equal.

The controller may be configured to generate the first residual driving torque based on a first driving torque at the location of the vehicle and a travel resistance.

The controller may be configured to calculate the first driving torque based on the first engine torque, the gear ratio of the transmission, a final gear ratio, a transmission efficiency of the transmission, and a tire radius, and to calculate the travel resistance based on a drag, a rolling resistance, and a slope resistance.

The controller may be configured to calculate the target gear ratio based on the first engine torque at the location of the vehicle, the gear ratio of the transmission, a first gradient, a second engine torque at the effective sloping point, and a second gradient.

The shift control apparatus may further include a status detector configured to detect status data for taking control of the transmission, wherein the controller may be configured to create a sport index based on the status data, check a gear shift limit zone based on the sport index, and stop shifting when the target gear position is included in the gear shift limit zone.

Another form of the present disclosure provides a shift control method for a vehicle, including: checking road information; checking an effective sloping point based on the road information; determining whether the effective sloping point is reached within a predetermined amount of time; when the effective sloping point is reached within the predetermined amount of time, calculating a target gear ratio based on a first engine torque at a location of the vehicle, a gear ratio of the transmission, and a gradient; setting a target gear position based on the target gear ratio; and shifting gears based on the target gear position.

In some forms of the present disclosure, gear shifts can be controlled by detecting a slope ahead based on road information, thereby improving the driver's drivability and enhancing fuel economy.

Furthermore, when there is a predicted change in driving load ahead, it may be possible to decide which gear would be the best to shift gears, thereby overcoming a lack of driving torque and reducing the frequency of kick downs.

Other effects that may be obtained or predicted in some forms of the present disclosure will be disclosed explicitly or implicitly in a detailed description of an exemplary form of the present disclosure. That is, various effects predicted in some forms of the present disclosure will be disclosed in a detailed description to be provided below.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
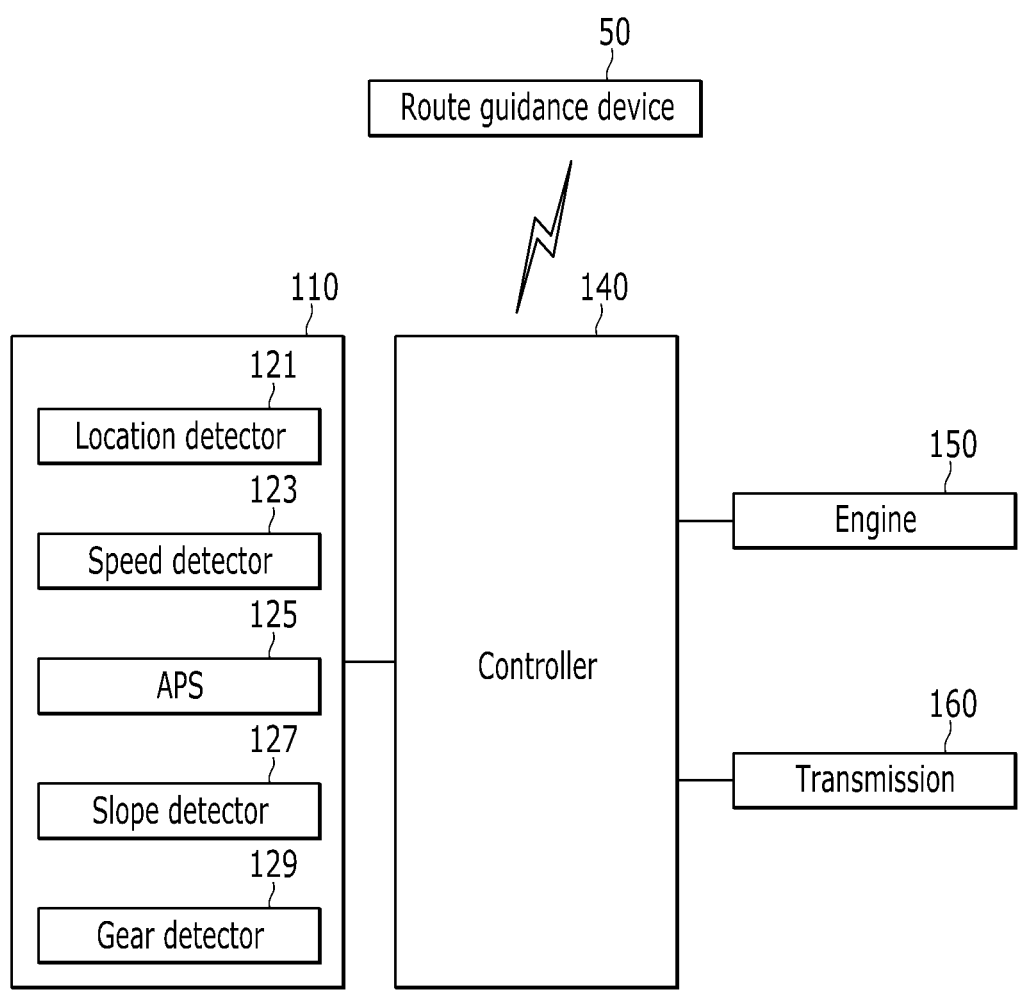
FIG. 1 is a schematic diagram of a shift control apparatus for a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, operating principles of forms of a shift control apparatus and method for a vehicle in some forms of the present disclosure will be described with reference to the attached drawings and the description. However, the drawings shown below and the detailed description set forth below relate to one exemplary form among several forms for effectively describing the features of the present disclosure. Therefore, the present disclosure is not limited to the drawings and description below.

In the following description of the present disclosure, a detailed description of known functions and configurations incorporated herein will be omitted when it may make the subject matter of the present disclosure rather unclear. Further, the terms used in the description are defined considering the functions of the present inventive concept and may vary depending on the intention or usual practice of a user or operator. Accordingly, the terms need to be defined based on what is discussed throughout the present disclosure.

Further, in the following exemplary forms, in order to efficiently describe a core technical feature of the present disclosure, terms may be appropriately changed, combined, or separated so as to be clearly understood by those skilled in the art, but the present disclosure is never limited thereto.

Hereinafter, an exemplary form of the present disclosure will be described below in detail with reference to the accompanying drawings.

FIG. 1 is a schematic diagram of a shift control apparatus for a vehicle in some forms of the present disclosure.

Referring to FIG. 1, the shift control apparatus for vehicle connects with a route guidance device 50.

The route guidance device 50 may provide the driver with road information such as speed limits and speed bumps. Such road information may include at least one among slope information, curvature information, speed limit information, and real-time traffic information on a road where the vehicle is driving.

Upon receiving a destination from the driver, the route guidance device 50 may generate guidance information based on the origin and destination and provide the driver with a route to the destination based on the generated route guidance information.

The route guidance device 50 sends and receives data by connecting with the shift control apparatus. That is, the route guidance device 50 may send road information to the shift control apparatus.

The route guidance device 50 may be disposed inside the vehicle or configured as a separate unit.

The route guidance device 50 may be of any type as long as it can provide the driver with road information. For example, the route guidance device 50 may be any one of the following: a mobile communication terminal, a mobile computer such as a tablet PC, a laptop, or a netbook, and an audio video navigation (AVN).

The shift control apparatus includes a status detector 110, a controller 140, an engine 150, and a transmission 160.

The status detector 110 detects status data for taking control of the vehicle's gear shifting. To this end, the status detector 110 includes a location detector 121, a speed detector 123, an accelerator position sensor (hereinafter, commonly referred to as "APS") 125, a slope detector 127, and a gear detector 129.

The location detector 121 receives radio waves from a GPS (Global Positioning System) satellite and detects the vehicle's location information based on the signals of these radio waves. The location detector 121 provides the controller 140 with the location information.

The speed detector 123 detects the vehicle's speed and provides the controller 140 with the detected vehicle speed. The speed detector 123 may be mounted on a drive wheel of the vehicle.

Meanwhile, if the speed detector 123 is not provided, the controller 140 may calculate the vehicle speed based on the vehicle's location detected by the location detector 121.

The APS 125 measures how hard the driver presses the accelerator pedal. The APS 125 measures the positional value of the accelerator pedal (indicating how hard the accelerator pedal is pressed) and provides the controller 140 with a signal of this positional value. If the accelerator pedal is completely pressed, the positional value of the accelerator pedal is 100%. If the accelerator pedal is not pressed, the positional value of the accelerator pedal is 0%.

Instead of the APS 125, a throttle valve opening detector may be used which is mounted on an intake passage.

The slope detector 127 detects the slope of a road where the vehicle is located and provides the controller 140 with the detected slope.

The gear detector 129 detects the gear currently attached to the transmission 160. The gear detector 129 provides the controller 140 with the detected gear.

The controller 140 takes control of the overall operation of the vehicle. That is, the controller 140 may control the vehicle to drive by controlling the output torque of the engine 150.

The controller 140 receives road information from the route guidance device 50, and the controller 140 receives status data from the status detector 110.

The controller 140 checks an effective sloping point by using the road information. The effective sloping point may indicate a point at which a slope begins. The effective sloping point may be set to be a point at which the road gradient is greater than or equal to a set gradient.

The controller 140 determines whether the effective sloping point is reached within a predetermined amount of time. If the effective sloping point is reached within the predetermined amount of time, the controller 140 calculates a target gear ratio by using a first engine torque at the vehicle's location and the gear ratio of the transmission 160.

The controller 140 sets a target gear position according to the target gear ratio and controls the transmission 160 by using the target gear position.

The controller 140 may be implemented with one or more microprocessors run by a predetermined program, and the predetermined program may include a series of commands for performing each step included in a shift control method for a vehicle in some forms of the present disclosure to be described later. Such a shift control method for a vehicle will be described in more detail with reference to FIGS. 2 to 7.

The engine 150 creates power by burning a fuel. That is, the engine 150 may be various types of well-known engines 150, such as a traditional gasoline engine or diesel engine powered with fossil fuels.

A rotating power created from the engine 150 is transferred to the transmission 160.

The transmission 160 is connected to the engine 150, and a torque output from the engine 150 is supplied as an input torque. The transmission 160 keeps the vehicle running as a certain gear is selected to output driving torque to the drive wheels under control of the controller 140.

Hereinafter, a shift control method for a vehicle will be described with reference to FIGS. 2 to 7.

Figure 2:
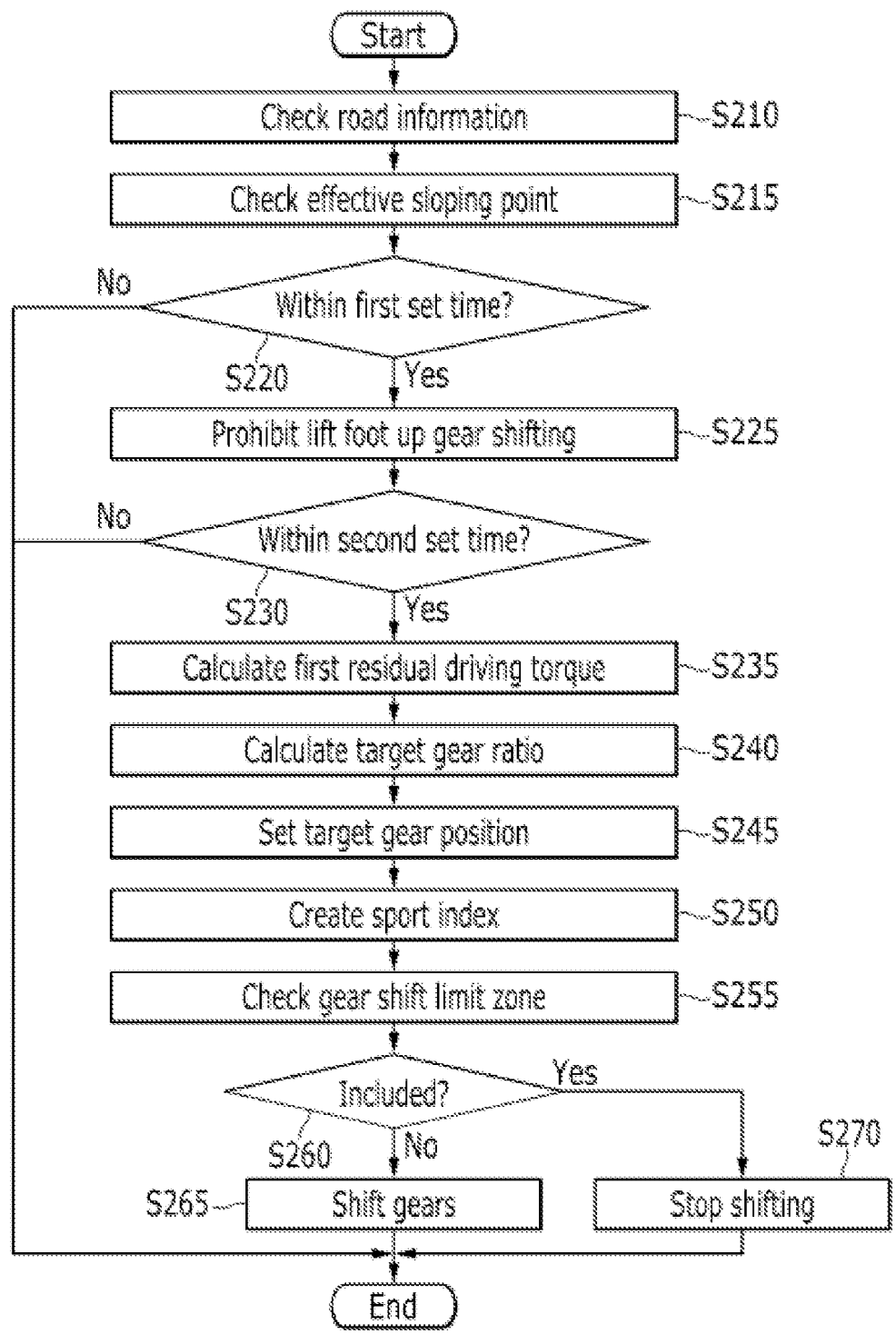
FIG. 2 is a flowchart of a shift control method for a vehicle.
Figure 3:
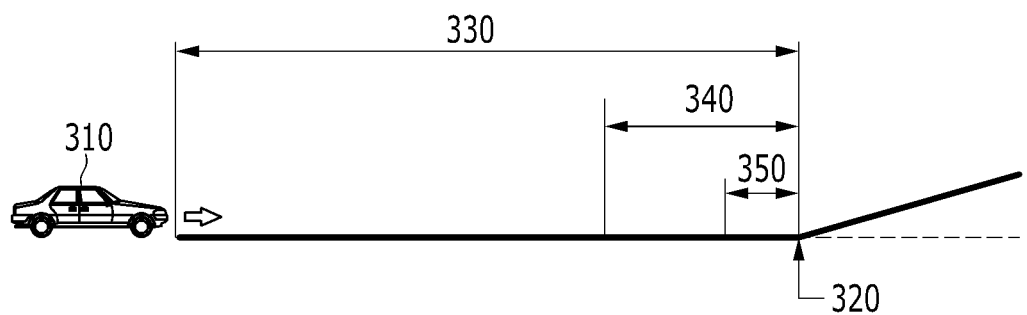
FIG. 3 is an illustration for explaining a shift control method for a vehicle.
Figure 4:
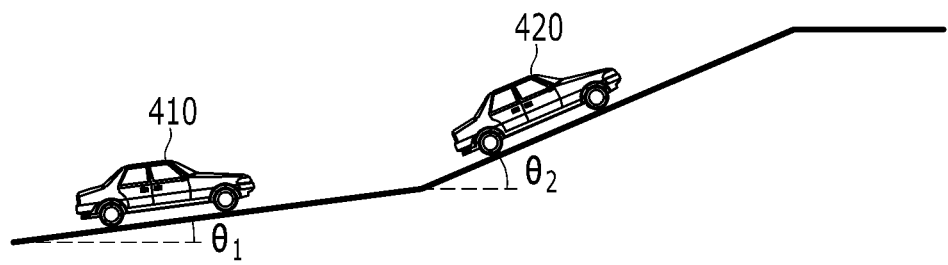
FIG. 4 is an illustration of the vehicle's location and a predicted sloping point.
Figure 5:
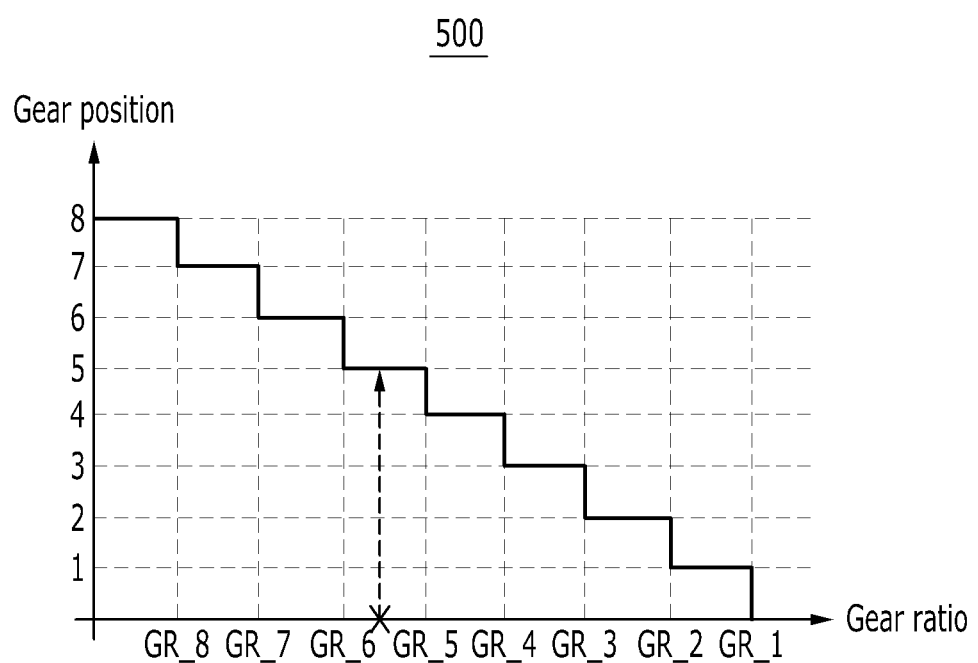
FIG. 5 is an illustration of a shift control map.
Figure 6:
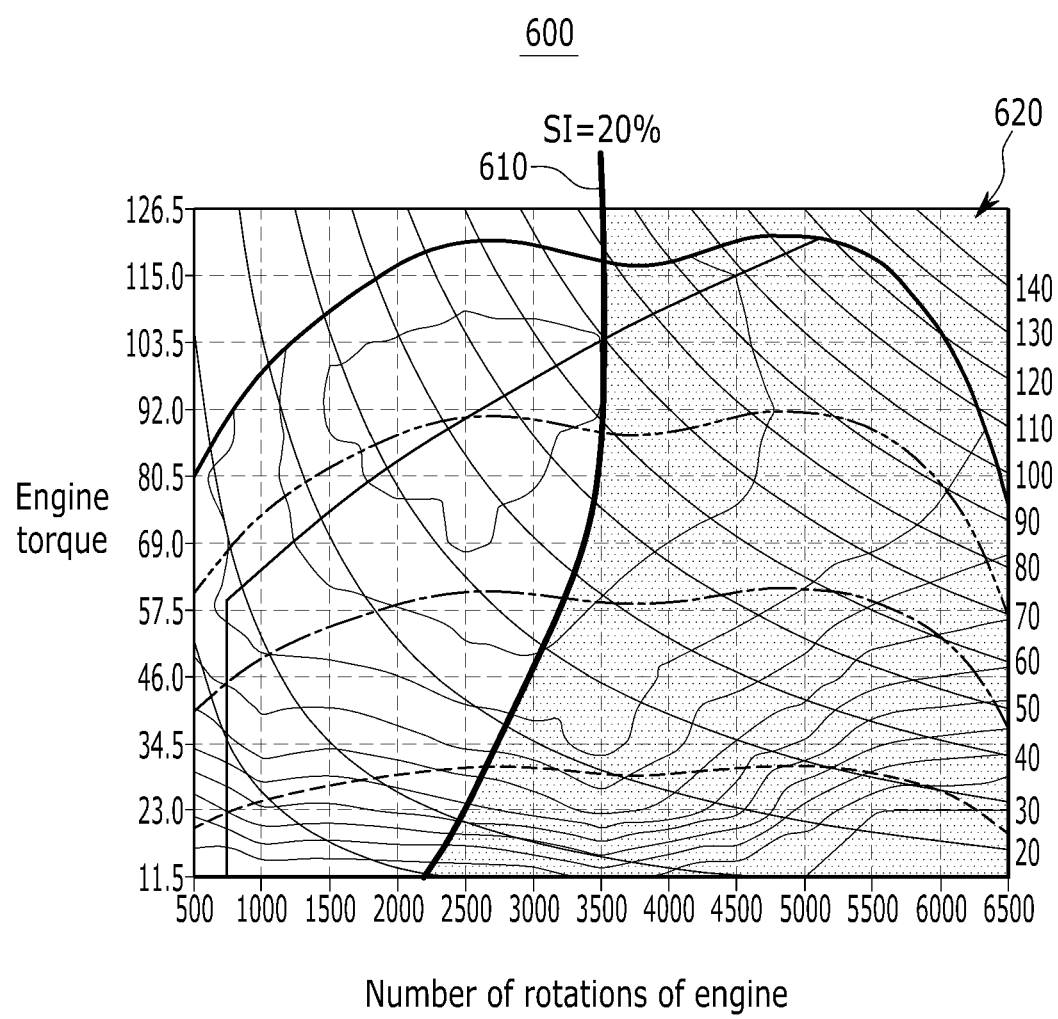
FIGS. 6 and 7 are illustrations of a fuel efficiency map.
Figure 7:
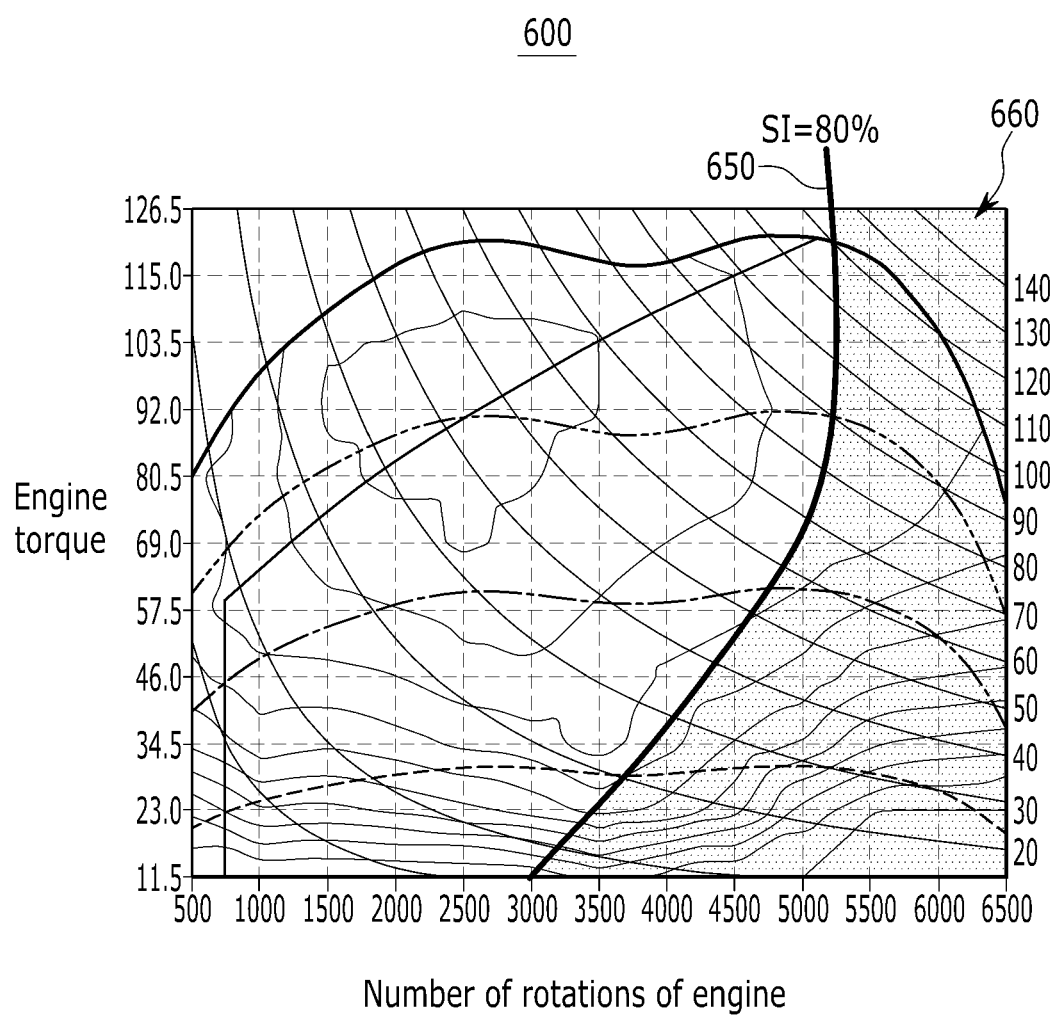

FIG. 2 is a flowchart of a shift control method for a vehicle in some forms of the present disclosure. FIG. 3 is an illustration for explaining a shift control method for a vehicle in some forms of the present disclosure. FIG. 4 is an illustration of the vehicle's location and a predicted sloping point in some forms of the present disclosure. FIG. 5 is an illustration of a shift control map in some forms of the present disclosure. FIGS. 6 and 7 are illustrations of a fuel efficiency map in some forms of the present disclosure.

Referring to FIG. 2, the controller 140 checks road information (S210). That is, the controller 140 receives and checks road information from the route guidance device. The road information may include at least one among slope information, curvature information, speed limit information, and real-time traffic information on a road where the vehicle is driving.

The controller 140 checks an effective sloping point (S215). That is, the controller 140 determines whether there is a sloping road ahead of the vehicle based on road information and location information in status data.

The controller 140 checks an effective sloping point by using road information and location information in status data. The effective sloping point may refer to a point at which a sloping road begins ahead of the road where the vehicle is located, and may be set to be a point at which the road gradient is greater than or equal to a set gradient. For example, as shown in FIG. 3, the vehicle may be located at 310, and the effective sloping point may be indicated as in reference numeral 320.

The controller 140 determines whether the effective sloping point is reached within a first set time (S220). Specifically, the controller 140 checks the offset distance between the vehicle's location and the effective sloping point. The vehicle's location refers to a point at which the vehicle is currently located, which may vary as the vehicle drives. The offset distance may be indicated as in 330 of FIG. 3.

The controller 140 creates a time taken until arrival based on the offset distance and the vehicle speed. The time taken until arrival may indicate the time taken from the vehicle's location to the effective sloping point. The controller 140 determines whether the effective sloping point is reached within a first set time. In this case, the first set time is a period of time set to prohibit lift foot up (LFU) gear shifts, which may be a predetermined value. The first set time may be set through a prescribed algorithm (e.g., a program and a probability model). For example, corresponding to the first set time, the distance between a point from which the lift foot up gear shifting is prohibited and the effective sloping point may be indicated as in reference numeral 340 of FIG. 3.

If the effective sloping point is reached within the first set time, the controller 140 prohibits lift foot up gear shifting (S225). The reason why lift foot up gear shifting is prohibited is to prevent the driver from up-shifting unnecessarily by manipulating the accelerator pedal before making a predicted gear shift.

The controller 140 determines whether the effective sloping point is reached within a second set time (S230). In this case, the second set time is a period of time set to shift gears depending on the slope, which may be a predetermined value. The second set time may be set through a prescribed algorithm (e.g., a program and a probability model). For example, corresponding to the second set time, the distance between a point from which gear shifting starts and the effective sloping point may be indicated as in reference numeral 350 of FIG. 3.

If the effective sloping point is reached within the second set time, the controller 140 calculates a first residual driving torque (S235). In other words, the controller 140 calculates a first driving torque by using a first engine torque at the vehicle's location, the gear ratio of the transmission 160, a final gear ratio (the gear ratio of a final reducing gear), the transmission efficiency of the transmission 160, and the tire radius. In this case, the first engine torque may represent a torque that is output from the engine 150 and input into the transmission 150 when the vehicle is at the current location.

That is, the controller 140 may calculate the first driving torque by the following [Equation 1]:

$$D1 = \frac{Te_1 \times GR_1 \times FGR \times \eta}{R} \quad \text{[Equation 1]}$$

where D1 is the first driving torque, $Te_1$ is the first engine torque, $GR_1$ is the gear ratio of the transmission 160, FGR is the final gear ratio, $\eta$ is the transmission efficiency ($\eta$=1.0) of the transmission 160, and R is the tire radius.

The controller 140 calculates travel resistance by using drag, rolling resistance, and slope resistance. In this case, the controller 140 calculates travel resistance by adding drag, rolling resistance, and slope resistance. The controller 140 may calculate drag by using drag coefficient, air density, the frontal projected area of the vehicle, and vehicle speed, calculate rolling resistance by using the friction coefficient of the tires, the vehicle mass, gravitational acceleration, and a first gradient, and calculate slope resistance by using the vehicle mass, gravitational acceleration, and the first gradient.

That is, the controller 140 may calculate travel resistance by the following [Equation 2]:

$$DR = \tfrac{1}{2} C_d \rho A V_1^2 + \mu mg \cos \eta_1 + mg \sin \theta_1 \quad \text{[Equation 2]}$$

where DR is the travel resistance, $C_d$ is the drag coefficient, $\rho$ is the air density, A is the frontal projected area, V is the vehicle speed, $\mu$ is the friction coefficient of the tires, m is the vehicle mass, g is gravitational acceleration, and $\Theta_1$ is a first angle of slope relative to the first gradient. In this case, as shown in FIG. 4, $\Theta_1$ may be the first angle of slope when the vehicle is at the current location 410. The friction coefficient of the tires may vary depending on road conditions. For example, the friction coefficient of the tires against asphalt may be 0.01, and the friction coefficient of the tires against unpaved roads may be 0.08.

The controller 140 calculates a first residual driving torque by using a first driving torque and travel resistance. In this case, the controller 140 calculates the first residual driving torque by subtracting the travel resistance from the first driving torque.

That is, the controller 140 may calculate the first residual driving torque by the following [Equation 3]:

$$SD1 = \frac{Te_1 \times GR_1 \times FGR \times \eta}{R} - \frac{1}{2}C_d\rho AV_1^2 - \mu mg\cos\theta_1 - mg\sin\theta_1 \quad \text{[Equation 3]}$$

where SD1 is the first driving torque, $Te_1$ is the first engine torque, $GR_1$ is the gear ratio of the transmission 160, FGR is the final gear ratio, $\eta$ is the transmission efficiency ($\eta=1.0$) of the transmission 160, R is the tire radius, $C_d$ is the drag coefficient, $\rho$ is the air density, A is the frontal projected area, V is the vehicle speed, $\mu$ is the friction coefficient of the tires, m is the vehicle mass, g is gravitational acceleration, and $\Theta_1$ is the first angle of slope relative to the first gradient.

The controller 140 calculates a target gear ratio by using the first residual driving torque (S240). The controller 140 may check an effective sloping point 420, as shown in FIG. 4.

The controller 140 determines a second engine torque at the effective sloping point. In this case, it can be assumed that the second engine torque is equal to the first engine torque at the vehicle's location.

The controller 140 checks a second gradient at the effective sloping point based on road information. The controller 140 determines a second angle of slope by using the second gradient at the effective sloping point 420, as shown in FIG. 4.

The controller 140 calculates the target gear ratio in such a way that the first residual driving torque at the vehicle's location and the second residual driving torque at the effective sloping point are equal. In this case, the vehicle may downshift from the current gear position to climb a sloping road.

That is, the numerical expression by which the first driving torque and the second driving torque are equal may be represented by the following [Equation 4]:

$$\frac{Te_1 \times GR_1 \times FGR \times \eta}{R} - \frac{1}{2}C_d\rho AV_1^2 - \mu mg\cos\theta_1 - mg\sin\theta_1 = \quad \text{[Equation 4]}$$
$$\frac{Te_2 \times GR_2 \times FGR \times \eta}{R} - \frac{1}{2}C_d\rho AV_2^2 - \mu mg\cos\theta_2 - mg\sin\theta_2$$

where $Te_2$ is the second engine torque, $GR_2$ is the target gear ratio, and $\Theta_2$ is the second angle of slope relative to the second gradient.

The controller 140 may switch from [Equation 4] to [Equation 5] in order to calculate the target gear ratio.

$$GR_2 = \frac{1}{Te_2} \times \Big[ Te_1 \times GR_1 - \quad \text{[Equation 5]}$$
$$\frac{mgR}{FGR \times \eta}\{\mu(\cos\theta_1 - \cos\theta_2) + (\sin\theta_1 - \sin\theta_2)\}\Big]$$

The controller 140 may derive [Equation 6] by replacing the cosine (cos) included in [Equation 5] with the sine (sin). The controller 140 may calculate the target gear ratio by [Equation 6]:

$$GR_2 = \frac{1}{Te_2} \times \Big[ Te_1 \times GR_1 - \frac{mgR}{FGR \times \eta} \quad \text{[Equation 6]}$$
$$\Big\{-2\mu\sin\frac{1}{2}(\theta_1 + \theta_2)\sin\frac{1}{2}(\theta_1 - \theta_2) + (\sin\theta_1 - \sin\theta_2)\Big\}\Big]$$

The controller 140 sets a target gear position according to the target gear ratio (S245). Specifically, the controller 140 checks a preset gear shift control map. The gear shift control map includes different gear positions for different gear ratios. For example, the gear shift control map may be created as depicted in reference numeral 500 of FIG. 5.

The controller 140 sets a target gear position matching a target gear ratio by using the gear shift control map. For example, if the target gear ratio given by [Equation 6] is 0.998, the controller 140 may set the target gear position to fifth gear.

The controller 140 may create a sport index by using status data (S250). In other words, the controller 140 sets a membership function by applying a fuzzy control theory to status data including at least one among the positional value of the accelerator pedal, the amount of change to the accelerator pedal, the vehicle speed, the acceleration, and the slope, and creates a sport index, which is a fuzzy result value, from the membership function.

The controller 140 may determine that, the higher the sport index, the sportier the driving tendency, and that, the lower the sport index, the milder the driving tendency.

That is, a driver who tends to be mild-driving may be assumed to have a defensive driving pattern with a habit of accelerating slowly, whereas a driver who tends to be sporty-driving may be assumed to have an aggressive driving pattern with a habit of accelerating rapidly.

The controller 140 checks a gear shift limit zone with respect to the sport index (S255). In other words, the controller 140 checks a fuel efficiency map, and checks a gear shift limit zone with respect to the sport index by using the fuel efficiency map. The reason why a gear shift limit zone is set is to ensure fuel economy.

In this case, the fuel efficiency map may refer to a contour map describing fuel efficiency relative to the engine torque and the number of rotations of the engine. The fuel efficiency map may include gear shift limit lines for multiple sporty indices. The gear shift limit zone may be the right side of a gear shift limit line.

For example, as shown in FIG. 6, the fuel efficiency map 600 may include a first gear shift limit line 610 for the sport index 20% and a first gear shift limit zone 620 for the sport index 20%.

As shown in FIG. 7, the fuel efficiency map 600 may include a second gear shift limit line 650 for the sport index 80% and a second gear shift limit zone 660 for the sport index 80%.

The controller 140 determines whether the target gear position is included in the gear shift limit zone (S260).

If the target gear position is not included in the gear shift limit zone, the controller 140 shifts gears to the target gear position (S265).

If the target gear position is included in the gear shift limit zone, the controller 140 stops shifting (S270). That is, if the target gear position is included in the gear shift limit zone, the controller 140 prohibits down-shifting to the target gear position and drops the prohibition on lift foot up gear shifting which occurs by the driver's manipulation of the accelerator pedal.

The description of the disclosure is merely exemplary in nature and, thus, variations that do not depart from the substance of the disclosure are intended to be within the scope of the disclosure. Such variations are not to be regarded as a departure from the spirit and scope of the disclosure.

DESCRIPTION OF SYMBOLS

50: route guidance device 110: status detector 140: controller 150: engine 160: transmission

What is claimed is:

1. A shift control apparatus for a vehicle, the apparatus comprising:
   an engine;
   a transmission configured to receive power from the engine;
   a controller configured to:
      check an effective sloping point based on road information;
      calculate a target gear ratio based on a first engine torque at a location of the vehicle and a gear ratio of the transmission when the effective sloping point is reached within a predetermined amount of time;
      set a target gear position based on the target gear ratio; and
      control the transmission based on the target gear position; and
   a status detector configured to detect status data for taking control of the transmission,
   wherein the controller is configured to:
      create a sport index based on the status data;
      check a gear shift limit zone based on the sport index; and
      stop shifting when the target gear position is included in the gear shift limit zone.

2. The shift control apparatus of claim 1, wherein the controller is configured to calculate the target gear ratio such that a first residual driving torque at the vehicle's location and a second residual driving torque at the effective sloping point are equal.

3. The shift control apparatus of claim 2, wherein the controller is configured to generate the first residual driving torque based on a first driving torque at the location of the vehicle and a travel resistance.

4. The shift control apparatus of claim 3, wherein the controller is configured to:
   calculate the first driving torque based on the first engine torque, the gear ratio of the transmission, a final gear ratio, a transmission efficiency of the transmission, and a tire radius; and
   calculate the travel resistance based on a drag, a rolling resistance, and a slope resistance.

5. The shift control apparatus of claim 1, wherein the controller is configured to calculate the target gear ratio based on the first engine torque at the location of the vehicle, the gear ratio of the transmission, a first gradient, a second engine torque at the effective sloping point, and a second gradient.

6. A shift control method for a vehicle, the method comprising:
   checking road information;
   checking an effective sloping point based on the road information;
   determining whether the effective sloping point is reached within a predetermined amount of time;
   when the effective sloping point is reached within the predetermined amount of time, calculating a target gear ratio based on a first engine torque at a location of the vehicle, a gear ratio of the transmission, and a gradient;
   setting a target gear position based on the target gear ratio; and
   shifting gears based on the target gear position,
   wherein shifting the gears based on the target gear position comprises:
      creating a sport index based on status data;
      checking a gear shift limit zone based on the sport index;
      determining whether the target gear position is included in the gear shift limit zone; and
      when the target gear position is not included in the gear shift limit zone, shifting gears based on the target gear position.

7. The shift control method of claim 6, wherein calculating the target gear ratio comprises:
   calculating the target gear ratio such that a first residual driving torque at the location of the vehicle and a second residual driving torque at the effective sloping point are equal.

8. The shift control method of claim 7, wherein calculating the target gear ratio comprises:
   calculating a first driving torque based on the first engine torque, the gear ratio of the transmission, a final gear ratio, a transmission efficiency of the transmission, and a tire radius;
   calculating a travel resistance based on a drag, a rolling resistance, and a slope resistance; and
   calculating the first residual driving torque based on the first driving torque and the travel resistance.

9. The shift control method of claim 6, wherein calculating the target gear ratio comprises:
   calculating the target gear ratio based on the first engine torque at the location of the vehicle, the gear ratio of the transmission, a first gradient, a second engine torque at the effective sloping point, and a second gradient.

10. The shift control method of claim 6, wherein shifting the gears based on the target gear position further comprises:
    when the target gear position is included in the gear shift limit zone, stopping shifting.

11. The shift control method of claim 6, wherein determining whether the effective sloping point is reached within the predetermined amount of time comprises:
    prohibiting lift foot up (LFU) gear shifts when the effective sloping point is reached within the predetermined amount of time.

12. The shift control method of claim 11, wherein calculating the target gear ratio comprises:
    calculating the target gear ratio such that a first residual driving torque at the location of the vehicle and a second residual driving torque at the effective sloping point are equal.

13. The shift control method of claim 12, wherein calculating the target gear ratio comprises:
    calculating a first driving torque based on the first engine torque, the gear ratio of the transmission, a final gear ratio, a transmission efficiency of the transmission, and a tire radius;
    calculating a travel resistance based on a drag, a rolling resistance, and a slope resistance; and
    calculating the first residual driving torque based on the first driving torque and the travel resistance.

14. The shift control method of claim 11, wherein calculating the target gear ratio comprises:
   calculating the target gear ratio based on the first engine torque at the location of the vehicle, the gear ratio of the transmission, a first gradient, a second engine torque at the effective sloping point, and a second gradient.

* * * * *